(12) United States Patent
Takenaka et al.

(10) Patent No.: US 9,856,347 B2
(45) Date of Patent: Jan. 2, 2018

(54) CURABLE COMPOSITION, CURED PRODUCT THEREOF, AND WAFER LEVEL LENS

(71) Applicant: DAICEL CORPORATION, Osaka-shi, Osaka (JP)

(72) Inventors: Hiroki Takenaka, Himeji (JP); Kyohei Ishida, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/113,399

(22) PCT Filed: Feb. 16, 2015

(86) PCT No.: PCT/JP2015/054128
§ 371 (c)(1),
(2) Date: Jul. 21, 2016

(87) PCT Pub. No.: WO2015/129503
PCT Pub. Date: Sep. 3, 2015

(65) Prior Publication Data
US 2017/0009003 A1  Jan. 12, 2017

(30) Foreign Application Priority Data
Feb. 28, 2014 (JP) .................. 2014-038275

(51) Int. Cl.
| C08G 59/22 | (2006.01) |
| C08G 59/20 | (2006.01) |
| G02B 1/04 | (2006.01) |
| C08L 63/00 | (2006.01) |
| G02B 3/00 | (2006.01) |

(52) U.S. Cl.
CPC ........... *C08G 59/226* (2013.01); *C08G 59/20* (2013.01); *C08L 63/00* (2013.01); *G02B 1/041* (2013.01); *G02B 3/00* (2013.01)

(58) Field of Classification Search
None
See application file for complete search history.

(56) References Cited

U.S. PATENT DOCUMENTS

| 3,242,108 | A | * | 3/1966 | McGary, Jr. | ......... C08G 18/003 521/104 |
| 5,721,020 | A | * | 2/1998 | Takami | ........... C08G 59/24 427/508 |
| 5,863,970 | A | * | 1/1999 | Ghoshal | ........... C08G 59/226 257/E21.505 |
| 6,232,362 | B1 | * | 5/2001 | Agars | ........... C08G 77/38 522/148 |
| 6,245,828 | B1 | | 6/2001 | Weinmann et al. | |
| 6,291,540 | B1 | * | 9/2001 | Priou | ........... C07C 25/18 522/100 |
| 6,902,816 | B1 | * | 6/2005 | Bertry | ........... C08J 7/047 428/447 |
| 7,368,524 | B2 | * | 5/2008 | Eckert | ........... A61K 6/0017 523/109 |
| 8,604,150 | B2 | * | 12/2013 | Morinaka | ........... B82Y 10/00 522/148 |
| 2002/0002212 | A1 | | 1/2002 | Weinmann et al. | |
| 2004/0024113 | A1 | | 2/2004 | Weinmann et al. | |
| 2005/0170187 | A1 | * | 8/2005 | Ghoshal | ........... C08G 59/22 428/413 |
| 2006/0039889 | A1 | * | 2/2006 | Lafaysse | ........... C08G 59/306 424/78.09 |
| 2009/0074374 | A1 | | 3/2009 | Fujiue et al. | |
| 2009/0137695 | A1 | * | 5/2009 | Takabayashi | ........ C09D 11/322 522/31 |
| 2010/0249341 | A1 | * | 9/2010 | Sato | ........... C07D 303/04 525/523 |
| 2012/0257128 | A1 | * | 10/2012 | Seo | ........... G02B 27/2214 349/15 |
| 2013/0203882 | A1 | | 8/2013 | Cherkaoui et al. | |
| 2013/0241086 | A1 | * | 9/2013 | Sakane | ........... C08G 59/24 257/788 |
| 2013/0338286 | A1 | * | 12/2013 | Furuta | ........... C08G 77/06 524/379 |
| 2014/0160405 | A1 | * | 6/2014 | Huh | ........... G02F 1/133528 349/96 |
| 2015/0212300 | A1 | | 7/2015 | Kubo et al. | |
| 2016/0122466 | A1 | * | 5/2016 | Nakamura | ........... C08G 59/24 528/418 |
| 2016/0311968 | A1 | * | 10/2016 | Fujikawa | ........... C08G 59/38 |

FOREIGN PATENT DOCUMENTS

| DE | 19648283 A1 | 5/1998 |
| JP | 64-26693 A | 1/1989 |

(Continued)

OTHER PUBLICATIONS

International Search Report issued in PCT/JP2015/054128, dated Apr. 21, 2015.

(Continued)

*Primary Examiner* — Robert S Loewe
(74) *Attorney, Agent, or Firm* — Birch, Stewart, Kolasch & Birch, LLP

(57) ABSTRACT

Provided is a curable composition that is rapidly cured to form a cured product. The cured product resists yellowing, successfully maintains excellent transparency over a long time even in a high-temperature environment, and is advantageously usable as or in a wafer-level lens. The curable composition according to the present invention includes a cycloaliphatic epoxide (A), a siloxane compound (B), and a curing agent (C). The cycloaliphatic epoxide (A) is represented by Formula (1). The siloxane compound (B) contains two or more glycidyl groups per molecule. In the formula, X is selected from a single bond and a linkage group.

[Chem. 1]

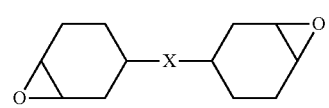

(1)

14 Claims, No Drawings

(56) References Cited

FOREIGN PATENT DOCUMENTS

| JP | 9-263627 A | 10/1997 | |
|---|---|---|---|
| JP | 2000-344867 A | 12/2000 | |
| JP | 2004-352771 A | 12/2004 | |
| JP | 2007-270114 A | 10/2007 | |
| JP | 2011-138089 A | 7/2011 | |
| JP | 2013-525551 A | 6/2013 | |
| WO | WO 2011134686 A1 * | 11/2011 | ............. C08L 83/06 |
| WO | WO 2012/093589 A1 | 7/2012 | |
| WO | WO 2014/034507 A1 | 3/2014 | |

OTHER PUBLICATIONS

Written Opinion of the International Searching Authority issued in PCT/JP2015/054128 (PCT/ISA/237), dated Apr. 21, 2015.

* cited by examiner

CURABLE COMPOSITION, CURED PRODUCT THEREOF, AND WAFER LEVEL LENS

TECHNICAL FIELD

The present invention relates to a curable composition including a cycloaliphatic epoxide and a siloxane compound. The present invention also relates to a cured product of the curable composition, and a wafer-level lens prepared from the curable composition. This application claims priority to Japanese Patent Application No. 2014-038275 filed to Japan Feb. 28, 2014, the entire contents of which are incorporated herein by reference.

BACKGROUND ART

Glass has been used as a material for lenses (in particular, vehicle-mounted camera lenses), because the glass has heat resistance, transparency, and dimensional stability at excellent levels. However, the glass, even being a low-melting glass, has a high melting temperature of about 400° C. or higher and has poor workability. In addition, the glass causes high production cost, because heat upon glass shaping impairs the mold (shaping die), and this impedes repeated use of the mold. Accordingly, the use of resinous materials as an alternative to the glass has been investigated actively.

A known resinous material for lenses employs thermoplastic resins such as cycloolefin polymers and polycarbonates (Patent Literature (PTL) 1). These resins, however, have poor heat resistance and are impracticably used in vehicle-mounted camera lenses and other applications that require heat resistance.

As a possible solution to solve the heat resistance issue, there is proposed a technique of using an epoxide structurally including an isocyanurate ring as a principal skeleton (PTL 2). The epoxide, however, has poor curability and is hardly applied to the use as a material for wafer-level lenses, where the material has to be cured rapidly by heating for about 2 to about 3 minutes. In addition, the cured product of the epoxide is susceptible to yellowing and hardly maintains its transparency when exposed to a high-temperature environment for a long term.

CITATION LIST

Patent Literature

PTL 1: Japanese Unexamined Patent Application Publication (JP-A) No. H09-263627
PTL 2: JP-A No. 2000-344867

SUMMARY OF INVENTION

Technical Problem

Accordingly, the present invention has an object to provide a curable composition that is cured rapidly to form a cured product, where the cured product resists yellowing and successfully maintains excellent transparency over a long time even in a high-temperature environment.

The present invention has another object to provide a cured product that resists yellowing and successfully maintains excellent transparency over a long time in a high-temperature environment.

Solution to Problem

After intensive investigations to achieve the objects, the inventors of the present invention found a curable composition including a specific siloxane compound, a specific cycloaliphatic epoxide, and a curing agent, where the siloxane compound contains two or more glycidyl groups per molecule and can give a cured product that has excellent heat resistance and excellent anti-yellowing properties, and the cycloaliphatic epoxide offers excellent curability. The inventors found that this curable composition has such excellent curability as to rapidly form a cured product by heating and can form a cured product that resists yellowing and successfully maintains excellent transparency over a long time even in a high-temperature environment. The present invention has been made based on these findings.

Specifically, the present invention provides, according to an embodiment, a curable composition that includes a cycloaliphatic epoxide (A), a siloxane compound (B), and a curing agent (C). The cycloaliphatic epoxide (A) is represented by Formula (1):

[Chem. 1]

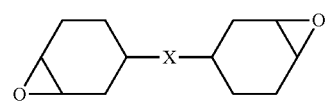

where X is selected from a single bond and a linkage group. The siloxane compound (B) contains two or more glycidyl groups per molecule.

In the curable composition, the cycloaliphatic epoxide (A) may include at least one of bis(3,4-epoxycyclohexylmethyl) ether and 2,2-bis(3,4-epoxycyclohex-1-yl)propane.

The curable composition may contain the cycloaliphatic epoxide (A) in a content of 5 to 70 weight percent based on the total amount (100 weight percent) of the curable composition.

The curable composition may be a curable composition for wafer-level lenses.

The present invention provides, according to another embodiment, a cured product of the curable composition.

The present invention provides, according to yet another embodiment, a method for producing a wafer-level lens. The method includes subjecting the curable composition to molding.

The present invention provides, according to still another embodiment, a wafer-level lens obtained by the production method.

In addition and advantageously, the present invention provides a camera including the wafer-level lens.

Specifically, the present invention relates to followings.

(1) The present invention relates to a curable composition that includes a cycloaliphatic epoxide (A), a siloxane compound (B), and a curing agent (C). The cycloaliphatic epoxide (A) is represented by Formula (1). The siloxane compound (B) contains two or more glycidyl groups per molecule.

(2) In the curable composition according to (1), the cycloaliphatic epoxide (A) may be represented by Formula (1) in which X is a linkage group containing at least one of a quaternary carbon and a heteroatom.

(3) In the curable composition according to (1), the cycloaliphatic epoxide (A) may include at least one of bis(3,4-epoxycyclohexylmethyl) ether and 2,2-bis(3,4-epoxycyclohex-1-yl)propane.

(4) The curable composition according to any one of (1) to (3) may contain the cycloaliphatic epoxide (A) in a content of 5 to 70 weight percent based on the total amount (100 weight percent) of the curable composition.

(5) In the curable composition according to any one of (1) to (4), the siloxane compound (B) may include a compound having a cyclic siloxane skeleton represented by Formula (2).

(6) In the curable composition according to any one of (1) to (5), the siloxane compound (B) may include a cyclic siloxane containing two or more glycidyl ether groups per molecule.

(7) In the curable composition according to any one of (1) to (6), the siloxane compound (B) may have a weight per epoxy equivalent of 100 to 350 g/eq.

(8) In the curable composition according to any one of (1) to (4), the siloxane compound (B) may include any of compounds represented by Formulae (2-1) to (2-11).

(9) The curable composition according to any one of (1) to (8) may contain the siloxane compound (B) in a content of 1 to 50 weight percent based on the total amount (100 weight percent) of the curable composition.

(10) The curable composition according to any one of (1) to (9) may further contain at least one of a hydrogenated glycidyl ether epoxide and a glycidyl isocyanurate compound in a total content of 5 to 40 weight percent based on the total amount (100 weight percent) of the curable composition.

(11) The curable composition according to any one of (1) to (10) may further contain a hydrogenated glycidyl ether epoxide in a content of 5 to 40 weight percent based on the total amount (100 weight percent) of the curable composition.

(12) The curable composition according to any one of (1) to (11) may further contain a glycidyl isocyanurate compound in a content of 5 to 30 weight percent based on the total amount (100 weight percent) of the curable composition.

(13) The curable composition according to any one of (1) to (12) may have a proportion of cycloaliphatic epoxy groups of 60 to 83 mole percent based on the total amount (100 mole percent) of all epoxy groups contained in the curable composition.

(14) In the curable composition according to any one of (1) to (13), the curing agent (C) may include a cationic-polymerization initiator.

(15) The curable composition according to any one of (1) to (14) may contain the curing agent (C) in a proportion of 0.01 to 15 parts by weight per 100 parts by weight of curable compounds contained in the curable composition.

(16) The curable composition according to any one of (10) to (15) may have a content of a compound excluding the cycloaliphatic epoxide (A), the siloxane compound (B), the hydrogenated glycidyl ether epoxide, the glycidyl isocyanurate compound, and the curing agent (C) of 5 weight percent or less based on the total amount (100 weight percent) of the curable composition.

(17) The curable composition according to any one of (1) to (16) may have a viscosity of 0.05 to 5 Pa·s at 25° C. and at a shear rate of 20 (1/s).

(18) The curable composition according to any one of (1) to (17) may be a curable composition for wafer-level lenses.

(19) The curable composition according to any one of (1) to (17) may be a curable composition for wafer-level lenses for use in vehicle-mounted cameras.

(20) The present invention also relates to a cured product of the curable composition according to any one of (1) to (19).

(21) The cured product according to (20) may have an internal transmittance of 70% or more in terms of 0.5 mm thickness for light at a wavelength of 400 nm.

(22) The cured product according to one of (20) and (21) may have an internal transmittance of 80% or more in terms of 0.5 mm thickness for light at a wavelength of 450 nm.

(23) The cured product according to any one of (20) to (22) may have a glass transition temperature (Tg) of 100° C. to 200° C.

(24) The cured product according to any one of (20) to (23) may have a refractive index of 1.45 to 1.55 at 25° C. for light at a wavelength of 589 nm, where the refractive index is determined in conformity with JIS K 7142.

(25) The present invention also relates to a method for producing a wafer-level lens. The method includes subjecting the curable composition according to any one of (1) to (19) to molding.

(26) The present invention also relates to a wafer-level lens obtained by the method according to (25) for producing a wafer-level lens.

(27) The present invention also relates to a camera including the wafer-level lens according to (26).

Advantageous Effects of Invention

The curable composition according to the present invention has the configuration and thereby has such excellent curability as to rapidly form a cured product by heating for about 2 to 3 minutes. The resulting cured product resists yellowing and successfully maintains excellent transparency over a long time in a high-temperature environment. The curable composition is therefore advantageously usable as materials for wafer-level lenses, in particular, as materials for wafer-level lenses for use in vehicle-mounted cameras.

DESCRIPTION OF EMBODIMENTS

Cycloaliphatic Epoxide (A)

The cycloaliphatic epoxide (A) for use as an essential component in the curable composition according to the present invention is a compound represented by Formula (1):

[Chem. 2]

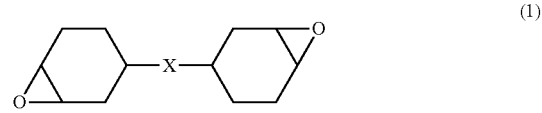

(1)

where X is selected from a single bond and a linkage group. The compound contains cycloaliphatic epoxy groups, where the term "cycloaliphatic epoxy group" refers to an epoxy group containing an oxygen atom bonded in a triangular arrangement to adjacent two carbon atoms constituting an alicycle. However, the siloxane compound (B) mentioned below is not included in the cycloaliphatic epoxide (A).

In Formula (1), X is selected from a single bond and a linkage group, where the "linkage group" refers to a divalent group containing one or more atoms. Non-limiting examples of the linkage group include divalent hydrocarbon groups, carbonyl group (—CO—), ether bond (—O—), ester bond (—COO—), amide bond (—CONH—), carbonate bond (—OCOO—), and groups each including two or more of them bonded to each other.

Non-limiting examples of the divalent hydrocarbon groups include $C_1$-$C_{18}$ straight or branched chain alkylene and divalent alicyclic hydrocarbon groups. Non-limiting examples of the $C_1$-$C_{18}$ straight or branched chain alkylene include methylene, methylmethylene, dimethylmethylene, dimethylene, and trimethylene. Non-limiting examples of the divalent alicyclic hydrocarbon groups include cycloalkylene (including cycloalkylidene), such as 1,2-cyclopentylene, 1,3-cyclopentylene, cyclopentylidene, 1,2-cyclohexylene, 1,3-cyclohexylene, 1,4-cyclohexylene, and cyclohexylidene.

Among them, the cycloaliphatic epoxide (A) for use in the present invention is preferably selected from such compounds as to less form a conjugated structure (in particular, a π-electron conjugated structure) as a result of dehydrogenation. The use of any of these compounds may give a cured product that has still better thermal stability of transparency. In particular, the cycloaliphatic epoxide (A) is more preferably selected from compounds in which two cycloaliphatic epoxy groups in a molecule are bonded to each other through a linkage group containing at least one of a quaternary carbon and a heteroatom.

Representative examples of the cycloaliphatic epoxide (A) include, but are not limited to, bis(3,4-epoxycyclohexylmethyl) ether and 2,2-bis(3,4-epoxycyclohex-1-yl)propane (i.e., 2,2-bis(3,4-epoxycyclohexyl)propane).

The curable composition according to the present invention may contain the cycloaliphatic epoxide (A) in a content (blending amount) of typically about 5 to 70 weight percent, preferably 15 to 60 weight percent, and particularly preferably 30 to 60 weight percent, based on the total amount (100 weight percent) of the curable composition. The cycloaliphatic epoxide (A), if contained in a content out of the range, tends to hardly contribute to curability of the curable composition and anti-yellowing properties of the cured product both at satisfactory levels. The cycloaliphatic epoxide (A) in the curable composition according to the present invention may include each of different ones alone or in combination.

The cycloaliphatic epoxide (A) may be contained in a proportion (blending amount) of typically about 20 to about 70 weight percent, preferably 30 to 60 weight percent, and particularly preferably 40 to 60 weight percent, relative to the total amount of all curable compounds (100 weight percent; the total of curable compounds such as epoxides and oxetane compounds) contained in the curable composition according to the present invention. The cycloaliphatic epoxide (A), if contained in a proportion out of the range, tends to hardly contribute to curability of the curable composition and thermal stability of transparency of the resulting cured product both at satisfactory levels.

Siloxane Compound (B)

The siloxane compound (B) for use as an essential component in the curable composition according to the present invention is a compound that imparts, to the resulting cured product, anti-yellowing properties (i.e., thermal stability of transparency) upon exposure to a high-temperature environment over a long time. The compound contains two or more glycidyl groups per molecule and still has a siloxane skeleton derived from siloxane bonds (Si—O—Si). Non-limiting examples of the siloxane skeleton in the siloxane compound (B) include cyclic siloxane skeletons; and polysiloxane skeletons (e.g., skeletons of straight or branched chain silicones (straight chain or branched chain polysiloxanes) and cage-like or ladder-like polysilsesquioxanes).

Among them, the siloxane compound (B) for use in the present invention is preferably selected from compounds having a cyclic siloxane skeleton represented by Formula (2). These compounds are hereinafter also referred to as "cyclic siloxane(s)". The cyclic siloxanes are preferred because of having excellent curability and giving a cured product that has, in particular, excellent thermal stability of transparency. Formula (2) is expressed as follows:

[Chem. 3]

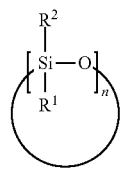

(2)

In Formula (2), $R^1$ and $R^2$ are, independently in each occurrence, selected from a glycidyl-containing monovalent group and alkyl, where at least two of n occurrences of $R^1$ and n occurrences of $R^2$ are glycidyl-containing monovalent groups in the compounds represented by Formula (2). The number n in Formula (2) represents an integer of 3 or more. $R^1$ and $R^2$ in the compounds represented by Formula (2) may be identical to or different from each other. The three or more occurrences of $R^1$ may be identical or different. Likewise, the three or more occurrences of $R^2$ may be identical or different.

The glycidyl-containing monovalent group is preferably selected from glycidyl ether groups represented by -A-O—$R^3$ where A represents alkylene; and $R^3$ represents glycidyl. Non-limiting examples of the alkylene A include $C_1$-$C_{18}$ straight or branched chain alkylene such as methylene, methylmethylene, dimethylmethylene, dimethylene, and trimethylene.

Non-limiting examples of the alkyl include $C_1$-$C_{18}$ straight or branched chain alkyl such as methyl, ethyl, propyl, and isopropyl, of which $C_1$-$C_6$ alkyl is preferred, and $C_1$-$C_3$ alkyl is particularly preferred.

In Formula (2), the number n represents an integer of 3 or more. In particular, the number n is preferably an integer of 3 to 6 so as to allow the curable composition to have excellent curability, and so as to allow the cured product to have heat resistance and mechanical strength both at excellent levels.

The siloxane compound (B) contains glycidyl groups in a number of 2 or more per molecule. The siloxane compound (B) preferably contains 2 to 6 glycidyl groups, and more preferably contains 2 to 4 glycidyl groups, from the viewpoints of curability of the curable composition, and heat resistance and mechanical strength of the cured product.

The siloxane compound (B) may have a weight per epoxy equivalent (epoxy equivalent) of preferably 100 to 350, particularly preferably 150 to 300, and most preferably 200 to 270, so as to allow the curable composition to have excellent curability, and so as to allow the cured product to have excellent thermal stability of transparency. The weight per epoxy equivalent herein is determined in conformity with JIS K 7236.

The curable composition according to the present invention may further contain, in addition to the siloxane compound (B), one or more other siloxane compounds. Non-limiting examples of such other siloxane compounds include cycloaliphatic epoxy-containing cyclic siloxanes; the cycloaliphatic epoxy-containing silicone resins described in JP-A No. 2008-248169; and the organopolysilsesquioxane resins containing at least two epoxy functional groups per molecule, described in JP-A No. 2008-19422. Even when the curable composition according to the present invention contains one or more other siloxane compounds, the curable composition may have a proportion of the siloxane compound (B) relative to all siloxane compounds in the curable composition of preferably 10 weight percent or more, more preferably 20 weight percent or more, furthermore preferably 30 weight percent or more, particularly preferably 50 weight percent or more, and most preferably 80 weight percent or more.

More specifically, examples of the siloxane compound (B) include, but are not limited to, cyclic siloxanes having two or more glycidyl groups per molecule and being represented by Formulae (2-1) to (2-11):

[Chem. 4]

(2-1)

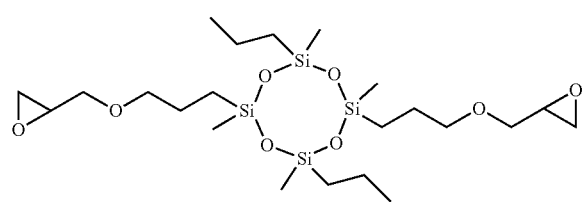

(2-2)

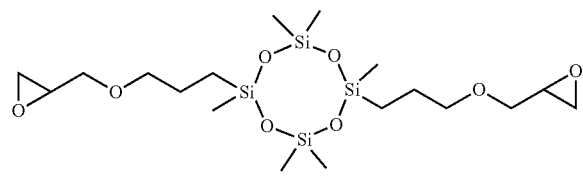

(2-3)

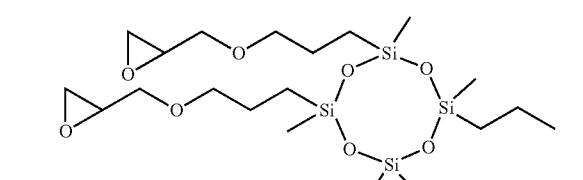

(2-4)

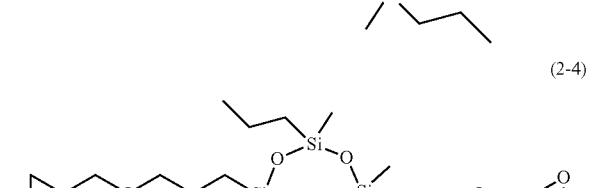

(2-5)

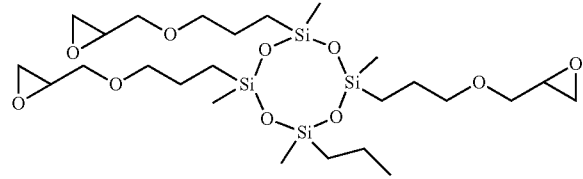

(2-6)

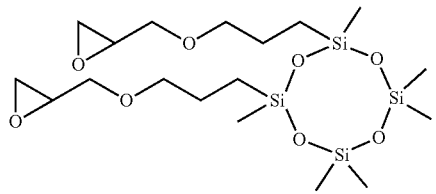

(2-7)

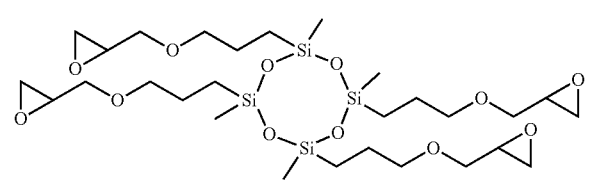

(2-8)

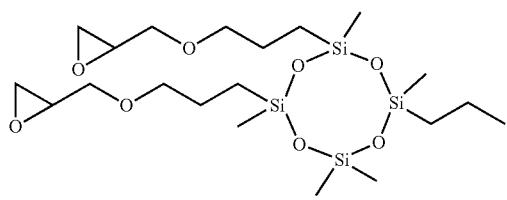

(2-9)

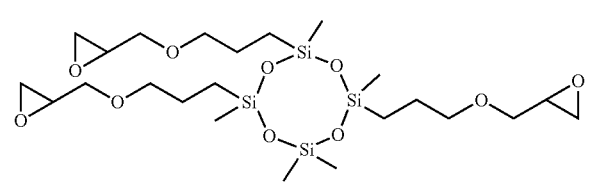

(2-10)

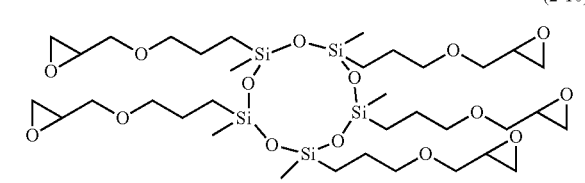

(2-11)

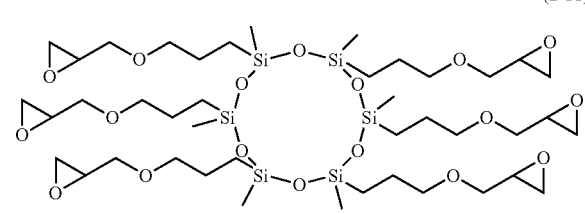

The siloxane compound (B) in the curable composition according to the present invention may include each of different ones alone or in combination. The siloxane compound (B) may also be selected from commercial products available typically under the trade names X-40-2701, X-40-2728, X-40-2738, and X-40-2740 (each from Shin-Etsu Chemical Co., Ltd.).

The curable composition according to the present invention may contain the siloxane compound (B) in a content (blending amount) of typically about 1 to about 50 weight percent, preferably 5 to 45 weight percent, particularly preferably 10 to 40 weight percent, and most preferably 20 to 40 weight percent, based on the total amount (100 weight percent) of the curable composition. The siloxane compound (B), if contained in a content out of the range, tends to hardly contribute to curability of the curable composition and thermal stability of transparency of the cured product both at satisfactory levels.

The siloxane compound (B) may be contained in a proportion (blending amount) of typically about 1 to about 60 weight percent, preferably 5 to 55 weight percent, particularly preferably 10 to 50 weight percent, and most preferably 25 to 40 weight percent, relative to the total amount (100 weight percent) of all curable compounds (the total of curable compounds such as epoxides and oxetane compounds) contained in the curable composition according to the present invention. The siloxane compound (B), if contained in a proportion out of the range, tends to hardly contribute to curability of the curable composition and thermal stability of transparency of the cured product both at satisfactorily levels.

Curing Agent (C)

The curing agent (C) for use as an essential component in the curable composition according to the present invention is a compound that initiates or accelerates the curing reaction of, or reacts with, curable compounds each containing one or more curable groups (in particular, one or more epoxy groups) to cure the curable compounds. The curable compounds are exemplified by, but are not limited to, the cycloaliphatic epoxide (A) and the siloxane compound (B). The curing agent (C) in the curable composition according to the present invention may include each of different ones alone or in combination.

The curing agent (C) for use herein may be selected typically from cationic-polymerization initiators (acid generators), which generate a cationic species to initiate polymerization upon the application typically of an ultraviolet ray and/or heat.

Non-limiting examples of the cationic-polymerization initiators that generate a cationic species by the application of an ultraviolet ray (ultraviolet irradiation) include hexafluoroantimonate salts, pentafluorohydroxyantimonate salts, hexafluorophosphate salts, and hexafluoroarsenate salts. Such cationic-polymerization initiators may also be selected from commercial products available typically under the trade name UVACURE 1590 (from DAICEL-CYTEC Company, Ltd.); the trade names CD-1010, CD-1011, and CD-1012 (each from Sartomer USA, LLC); the trade name IRGACURE 264 (from BASF SE); the trade name CIT-1682 (from Nippon Soda Co., Ltd.); and the trade name CPI-101A (from San-Apro Ltd.).

Non-limiting examples of the cationic-polymerization initiators that generate a cationic species by the application of heat (heat treatment) include aryldiazonium salts, aryliodonium salts, arylsulfonium salts, and arene-ion complexes. Such cationic-polymerization initiators may also be selected from commercial products available typically under the trade names PP-33, CP-66, and CP-77 (each from ADEKA CORPORATION); the trade name FC-509 (from 3M Company); the trade name UVE 1014 (from G.E.); the trade names San-Aid SI-60L, San-Aid SI-80L, San-Aid SI-100L, San-Aid SI-110L, and San-Aid SI-150L (each from SAN-SHIN CHEMICAL INDUSTRY CO., LTD.); and the trade name CG-24-61 (from Ciba Japan K.K.). The cationic-polymerization initiators of the above type may also be selected from compounds between a chelate compound and a silanol; and compounds between a chelate compound and a phenol. The chelate compound is a chelate compound between a metal and acetoacetic acid or a diketone, where the metal is exemplified by aluminum and titanium. The silanol is exemplified by triphenylsilanol. The phenol is exemplified by bisphenol-S.

The curing agent (C) may be contained in a proportion (blending amount) of typically about 0.01 to about 15 parts by weight, preferably 0.01 to 10 parts by weight, particularly preferably 0.05 to 10 parts by weight, and most preferably 0.1 to 5 parts by weight, per 100 parts by weight of curable compounds contained in the curable composition. The curable composition, when containing the curing agent (C) in a proportion within the range, can allow the resulting cured product to have heat resistance, light resistance, and transparency at excellent levels.

Other Curable Compounds

The curable composition according to the present invention may further contain one or more other curable compounds. The term "other curable compound(s)" refers to curable compound(s) other than the cycloaliphatic epoxide (A) and the siloxane compound (B). Exemplary other curable compounds include, but are not limited to, other epoxides; oxetane compounds; and vinyl ether compounds, where the term "other epoxides" refers to epoxides excluding the cycloaliphatic epoxide (A) and the siloxane compound (B). The curable composition, when containing one or more other curable compounds, may have better handleability with a controlled viscosity, and/or may resist cure shrinkage upon formation of the cured product. The curable composition according to the present invention may contain each of different other curable compounds alone or in combination.

Non-limiting examples of the other epoxides include cycloaliphatic epoxides containing one cycloaliphatic epoxy group, or three or more cycloaliphatic epoxy groups per molecule, such as 1,2:8,9-diepoxylimonene and di-2-ethylhexyl epoxyhexahydrophthalate; compounds each containing an alicycle and an epoxy group directly bonded to the alicycle through a single bond, such as 1,2-epoxy-4-(2-oxiranyl)cyclohexane adduct of 2,2-bis(hydroxymethyl)-1-butanol; aromatic glycidyl ether epoxides such as bisphenol-A epoxides, bisphenol-F epoxides, biphenol epoxides, phenol-novolac epoxides, cresol-novolac epoxides, cresol-novolac epoxides of bisphenol-A, naphthalene epoxides, and epoxides derived from trisphenolmethane; aliphatic glycidyl ether epoxides such as aliphatic polyglycidyl ethers; glycidyl ester epoxides; glycidylamine epoxides; hydrogenated glycidyl ether epoxides (nuclear-hydrogenated aromatic glycidyl ether epoxides); and glycidyl isocyanurate compounds.

Among them, the other epoxides are preferably selected from hydrogenated glycidyl ether epoxides and glycidyl isocyanurate compounds. These are preferred for allowing the cured product to have transparency and moisture resistance at excellent levels.

Specifically, examples of the hydrogenated glycidyl ether epoxides include, but are not limited to, compounds derived from bisphenol-A diglycidyl compounds via hydrogenation (i.e., hydrogenated bisphenol-A diglycidyl compounds), such as 2,2-bis[4-(2,3-epoxypropoxy)cyclohexyl]propane, 2,2-bis[3,5-dimethyl-4-(2,3-epoxypropoxy)cyclohexyl]propane, and multimers of them; compounds derived from bisphenol-F diglycidyl compounds via hydrogenation (i.e., hydrogenated bisphenol-F diglycidyl compounds), such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and multimers of them; hydrogenated biphenol epoxides; hydrogenated phenol-novolac epoxides; hydrogenated cresol-novolac epoxides; hydrogenated cresol-novolac epoxides of bisphenol-A; hydrogenated naphthalene epoxides; and hydrogenated products of epoxides derived from trisphenolmethane.

Concrete examples of the glycidyl isocyanurate compounds include, but are not limited to, triglycidyl isocyanurate, diglycidyl monoallyl isocyanurate, and monoglycidyl diallyl isocyanurate.

The other epoxides for use herein may also be selected from commercial products available typically under the trade names YX8000, YX8034, and YX8040 (each from Mitsubishi Chemical Corporation); the trade name TEPIC-VL (from Nissan Chemical Industries, Ltd.); and the trade names MA-DGIC and DA-MGIC (each from SHIKOKU CHEMICALS CORPORATION).

Non-limiting examples of the oxetane compounds include trimethylene oxide, 3,3-bis(vinyloxymethyl)oxetane, 3-ethyl-3-hydroxymethyloxetane, 3-ethyl-3-(2-ethylhexyloxymethyl)oxetane, 3-ethyl-3-(hydroxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis([1-ethyl(3-oxetanyl)]methyl) ether, 4,4'-bis[(3-ethyl-3-oxetanyl)methoxymethyl]bicyclohexyl, 1,4-bis[(3-ethyl-3-oxetanyl)methoxymethyl]cyclohexane, and 3-ethyl-3([(3-ethyloxetan-3-yl)methoxy]methyl)oxetane.

Non-limiting examples of the vinyl ether compounds include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ethers, polyethylene glycol monovinyl ethers, dipropylene glycol monovinyl ether, tripropylene glycol monovinyl ether, tetrapropylene glycol monovinyl ether, pentapropylene glycol monovinyl ether, oligopropylene glycol monovinyl ethers, poly(propylene glycol) monovinyl ethers, and derivatives of them.

The curable composition may have a content (blending amount) of the other curable compound(s) of typically 40 weight percent or less (preferably 5 to 40 weight percent), and preferably 30 weight percent or less (preferably 5 to 30 weight percent), based on the total amount (100 weight percent) of the curable composition.

In particular, the curable composition preferably contains a hydrogenated glycidyl ether epoxide in a proportion of typically about 5 to about 40 weight percent, and particularly preferably 10 to 30 weight percent, relative to the total amount (100 weight percent) of curable compounds contained in the curable composition. The curable composition, when containing the hydrogenated glycidyl ether epoxide in a proportion within the range, may allow the cured product to have better thermal stability of transparency. In contrast, the curable composition, if containing the hydrogenated glycidyl ether epoxide in a proportion greater than the range, may have lower curability and a lower glass transition temperature Tg and may be hardly used as a material for wafer-level lenses.

In addition or alternatively, the curable composition preferably contains a glycidyl isocyanurate compound in a proportion of typically 5 to 30 weight percent, and particularly preferably 5 to 20 weight percent, relative to the total amount (100 weight percent) of curable compounds contained in the curable composition. The curable composition, when containing the glycidyl isocyanurate compound in a proportion within the range, may have appropriate viscosity while allowing the resulting cured product to maintain transparency. In contrast, the curable composition, if containing the glycidyl isocyanurate compound in a proportion greater than the range, may have lower curability and may be hardly used as a material for wafer-level lenses.

The curable composition may have a proportion of cycloaliphatic epoxy groups of typically about 30 to about 83 mole percent, more preferably 50 to 80 mole percent, and particularly preferably 60 to 80 mole percent, based on the total amount (100 mole percent) of all epoxy groups (the total of glycidyl groups and cycloaliphatic epoxy groups) contained in the curable composition. This is preferred for allowing the curable composition to have satisfactory curability and to give a cured product having satisfactory thermal stability of transparency.

Additives and Other Components

The curable composition according to the present invention may further contain one or more known or common additives, in addition to the compounds. Non-limiting examples of the additives include metal oxide particles, rubber particles, silicone- or fluorine-containing antifoaming agents, silane coupling agents, fillers, plasticizers, leveling agents, antistatic agents, mold release agents, flame retardants, colorants, antioxidants, ultraviolet absorbers, ion adsorbents, pigments, and water- and oil-repellants. The content (blending amount) of these additives is typically preferably 5 weight percent or less based on the total amount (100 weight percent) of the curable composition. The curable composition according to the present invention may include a solvent. However, the curable composition, if containing the solvent in an excessively large amount, may cause the cured product to bear bubbles. To eliminate or minimize this, the amount of the solvent is preferably controlled to be 10 weight percent or less, and particularly preferably 1 weight percent or less, based on the total amount (100 weight percent) of the curable composition.

The curable composition according to the present invention may be prepared typically, but not limitatively, by blending the cycloaliphatic epoxide (A), the siloxane compound (B), the curing agent (C), and, as needed, other components, and stirring and mixing them with removal of bubbles typically in a vacuum. The stirring/mixing is preferably performed at a temperature of typically about 10° C. to about 60° C., using a known or common apparatus. Non-limiting examples of the apparatus include planetary centrifugal mixers, single-screw or multi-screw extruders, planetary mixers, kneaders, and dissolvers.

Cured Product

The curable composition according to the present invention, when subjected typically to the application of heat and/or light, can give a cured product. The resulting cured product is hereinafter also referred to as a "cured product according to the present invention". The curable composition according to the present invention has excellent curability. When heat is applied, the curable composition can form the cured product by heating at a temperature of typically about 100° C. to about 200° C. (preferably 120° C. to 160° C.) for a short time (e.g., about 1 to about 10 minutes, and preferably 1 to 3 minutes). This eliminates or minimizes heat-induced deterioration of a wafer-level lens mold. When light is to be applied, the light source may be selected typically from mercury lamps, xenon lamps, carbon arc lamps, metal halide lamps, sunlight, electron beams, and laser beams. After the application of light, heat may be further applied (heat treatment may be performed) at a temperature of typically about 50° C. to 180° C. to allow the curing reaction to further proceed.

After the completion of the application of heat and/or light, annealing is preferably performed to remove internal strain. The annealing is preferably performed typically via heating at a temperature of about 100° C. to about 200° C. for about 30 minutes to one hour.

The cured product according to the present invention may have an internal transmittance at 400 nm of typically 70% or more (e.g., 70% to 100%), preferably 75% or more, particularly preferably 80% or more, and most preferably 85% or more, in terms of 0.5 mm thickness. Even when exposed to a high-temperature environment of about 150° C. for about 220 hours, the cured product resists yellowing and successfully maintains the internal transmittance at 400 nm at a level of 70% or more (preferably 75% or more) in terms of 0.5 mm thickness.

The cured product according to the present invention may have an internal transmittance at 450 nm of typically 80% or more (e.g., 80% to 100%), preferably 85% or more, and particularly preferably 90% or more, in terms of 0.5 mm thickness. Even when exposed to a high-temperature environment of about 150° C. for about 220 hours, the cured product resists yellowing and successfully maintains the internal transmittance at 450 nm at a level of 75% or more (preferably 80% or more, and particularly preferably 85% or more) in terms of 0.5 mm thickness.

The cured product according to the present invention may have a glass transition temperature (Tg) of about 100° C. or higher (e.g., 100° C. to 200° C.), preferably 110° C. or higher, and particularly preferably 120° C. or higher. The cured product, if having a glass transition temperature lower than 100° C., may offer insufficient heat resistance in some uses, such as use as vehicle-mounted camera lenses. The glass transition temperature of the cured product may be measured typically by thermal analyses (e.g., analyses using a differential scanning calorimeter (DSC) and/or a thermomechanical analyzer (TMA)) or by dynamic viscoelastic measurement. More specifically, the glass transition temperature may be measured by the measurement method described in working examples.

The cured product according to the present invention may have a refractive index of typically about 0 to about 1.60, and preferably 1.45 to 1.55. The cured product can maintain the refractive index approximately at that level even when exposed to a high-temperature environment of about 150° C. for about 220 hours. The cured product according to the present invention may have an Abbe number of typically 45 or more, and preferably 50 or more. The cured product can maintain the Abbe number approximately at that level even when exposed to a high-temperature environment of 150° C. for 220 hours.

The curable composition according to the present invention has excellent curability and can be extremely rapidly cured to form a cured product that has excellent thermal stability of transparency. The curable composition is therefore advantageously usable as a curable composition for wafer-level lenses, and in particular as a curable composition for wafer-level lenses for use in vehicle-mounted cameras.

Wafer-Level Lens Production Method

The method according to the present invention for producing a wafer-level lens includes subjecting the curable composition to molding (shaping). The molding may be performed typically by cast molding or injection molding. The wafer-level lens mold may be any one selected from metal molds, glass molds, and plastic molds.

The cast molding includes simultaneous molding and individual molding, which respectively include steps as follows.

Simultaneous Molding

Step 1 of casting the curable composition into a wafer-level lens mold and applying heat and/or light to the curable composition to cure the curable composition, where the wafer-level lens mold includes, in its shape, two or more lens patterns aligned in a certain direction;

Step 2 of removing the wafer-level lens mold and performing annealing to give a cured product that includes, in its shape, two or more wafer-level lenses bonded to each other; and Step 3 of separating the cured product including two or more wafer-level lenses bonded to each other into individual pieces to give wafer-level lenses.

Individual Molding

Step 1 of casting the curable composition into a wafer-level lens mold having one lens pattern and applying heat and/or light to the curable composition to cure the curable composition; and Step 2 of removing the wafer-level lens mold and performing annealing to give a wafer-level lens.

The injection molding includes steps as follows:

Step 1 of pouring the curable composition into a wafer-level lens mold for injection molding and applying heat and/or light to the curable composition to cure the curable composition; and Step 2 of removing the wafer-level lens mold, performing annealing, and removing flash (fins) to give a wafer-level lens.

The application of heat (heat treatment), the application of light (light irradiation), and the annealing of the curable composition may be performed by the procedures described in the description about the cured product above.

The curable composition, when to be subjected to the simultaneous molding, preferably has a low viscosity and excellent flowability. This is preferred for excellent chargeability into the mold. The curable composition for use in the simultaneous molding may have a viscosity of typically about 0.05 to about 5 Pa·s, and preferably 0.1 to 2 Pa·s at 25° C. and a shear rate of 20 (1/s). The curable composition, when having a viscosity within the range, has excellent flowability, less causes bubbles to remain therein, and can be charged into the mold while less causing increase in injection pressure. Specifically, the curable composition has coatability and chargeability at excellent levels and offers excellent workability over the entire molding operation.

The cured product of the curable composition according to the present invention has excellent heat resistance and retains its shape (dimensions) satisfactorily even in a high-temperature environment of about 100° C. to about 200° C. This allows efficient production of a wafer-level lens having excellent lens-center alignment accuracy, even when annealing is performed after demolding. This gives advantages as follows. Assume that two or more plies of the cured product including two or more wafer-level lenses bonded to each other are stacked to give a stack, and the stack is cut while determining the cutting line position with reference to an outermost cured product in Step 3 of the simultaneous molding. In this case, wafer-level lenses can be separated from each other without significant damage. This enables efficient, low-cost production of wafer-level lenses or multilayer assemblies of wafer-level lenses.

The wafer-level lens obtained by the method according to the present invention for producing a wafer-level lens resists yellowing and can maintain high transparency even when exposed to a high-temperature environment over a long time. The wafer-level lens is therefore advantageously usable typically as camera imaging lenses, spectacle lenses, light beam condenser lenses, and light diffusing lenses. Non-limiting examples of the camera include vehicle-mounted cameras, digital cameras, personal computer (PC) cameras, cellular phones cameras, and security cameras, of which wafer-level cameras are typified. In particular, the wafer-level lens is advantageously usable as wafer-level lenses for vehicle-mounted cameras, which require heat resistance.

In addition, the wafer-level lens obtained by the method according to the present invention for producing a wafer-level lens has excellent heat resistance and, when to be mounted to a circuit board, can be mounted via reflow soldering. This allows a camera including the wafer-level lens according to the present invention to be directly mounted onto a printed circuit board (PCB) substrate via the same solder reflow process with surface mounting of other electronic components and gives products extremely efficiently.

EXAMPLES

The present invention will be illustrated in further detail with reference to several examples below. It should be noted, however, that the examples are by no means intended to limit the scope of the present invention.

Examples 1 to 5 and Comparative Examples 1 to 3

Components presented in Table 1 were blended in the given formulations (in part by weight), stirred and mixed at room temperature using a planetary centrifugal mixer, and yielded a uniform, transparent curable composition (cationically curable composition).

Next, the above-prepared curable composition was cured by a heat treatment process mentioned below and yielded a cured product. A flat mold was used for the preparation of the cured product.

Heat Treatment Process

Each of the curable compositions was cured and molded to a thickness of 0.5 mm using an imprinting molding machine (trade name NANOIMPRINTER NM-0501, supplied by Meisho Kiko Co.) in a molding profile below, cooled down to 25° C., demolded, further heated in an oven, which was preheated at 180° C., for 30 minutes for annealing, and yielded cured products (five cured products per each curable composition).

Molding profile: The curable composition is applied to the mold at 25° C., pressed (press-formed) to the predetermined thickness with adjustment of the pressing axis position, heated up to 150° C. at a rate of 30° C./minute, and held at 150° C. for 2 minutes.

The curable compositions and the cured products thereof prepared in the examples and the comparative examples were evaluated on properties as follows.

Viscosity

The viscosity of each of the curable compositions prepared in the examples and the comparative examples was measured at 25° C. and a shear rate of 20 (1/s) using a rheometer (trade name Physica MCR 301, supplied by Anton Paar GmbH).

Curing Rate

The curing rate was determined in the following manner. The heat output on curing of each of the curable compositions prepared in the examples and the comparative examples was measured upon heating in a nitrogen atmosphere under temperature conditions below using a differential scanning calorimeter (DSC) (trade name Q2000, supplied by TA Instruments). The resulting heat output on curing was defined as "heat output on curable composition curing".

Next, each of the curable compositions prepared in the examples and the comparative examples was cured by the heat treatment process to give a cured product (cured product after molding and before annealing treatment), and the cured product was further subjected to annealing to give a cured product after annealing. The heat outputs on curing of the cured product after molding and before aryl treatment and of the cured product after annealing were measured upon heating under the temperature conditions below. The measured heat outputs on curing were each defined as a "heat output on cured product curing". The curing rate was calculated according to the expression below.

Temperature Conditions

The sample is held at 50° C. for 3 minutes, subsequently heated up to 250° C. at a rate of 20° C./minutes, and held at 250° C. for 3 minutes.

Curing Rate Calculation Expression

Curing rate (%)={1−(Heat output on cured product curing)/(Heat output on curable composition curing)}×100

Glass Transition Temperature: Tg

Each of the cured products prepared in the examples and the comparative examples was subjected to measurement to plot tan δ in a nitrogen stream at a rate of temperature rise of 5° C./minute in a measurement temperature range of 0° C. to 300° C. at a frequency of 10 Hz and a strain of 0.05% using a solids viscoelastic analyzer (trade name RSA-III, supplied by TA Instruments). Based on the measurement result, the glass transition temperature Tg was read out from the peak top of tan δ.

Internal Transmittance

The internal transmittances (at 400 nm) of each of the cured products prepared in the examples and the comparative examples, and of the cured products after exposure to an environment of 150° C. for the time given in Table 1 were calculated according to the expression:

Internal transmittance at 400 nm=(Light transmittance at 400 nm)/(1−$r$)$^2$ $r=\{(n_1-1)/(n_1+1)\}^2$ The light transmittance at 400 nm was measured using a spectrophotometer (trade name U-3900, supplied by Hitachi High-Technologies Corporation); and $n_1$ is a refractive index at 400 nm and was a refractive index at 400 nm measured by the method below.

An internal transmittance at 450 nm was also calculated by a similar manner as above.

Refractive Index

The refractive index of each of the cured products prepared in the examples and the comparative examples, and of the cured products after exposure to an environment of 150° C. for the time given in Table 1 was measured by a method in conformity with JIS K 7142 using a refractometer (trade name Model 2010, supplied by Metricon Corporation). The refractive index is a refractive index at 25° C. for light at a wavelength of 589 nm.

Abbe Number

The Abbe number of each of the cured products prepared in the examples and the comparative examples, and of the cured products after exposure to an environment of 150° C. for the time given in Table 1 was calculated according to the expression:

Abbe number=$(n_d-1)/(n_f-n_c)$ where $n_d$ represents the refractive index for light at a wavelength of 589.2 nm; $n_f$ represents the refractive index for light at a wavelength of 486.1 nm; and $n_c$ represents the refractive index for light at a wavelength of 656.3 nm. The refractive indices herein were refractive indices as measured by the method for light at the wavelengths.

Results of the evaluations are collectively presented in Table 1.

TABLE 1

| | | Example 1 | Example 2 | Example 3 | Example 4 | Example 5 | Com. Ex. 1 | Com. Ex. 2 | Com. Ex. 3 |
|---|---|---|---|---|---|---|---|---|---|
| Curable compound | X-40-2728 | 30 | 30 | 30 | 30 | 30 | — | — | — |
| | X-40-2670 | — | — | — | — | — | — | 30 | — |
| | YX8040 | 30 | 20 | 10 | 10 | — | — | — | — |
| | A-1 | 40 | 50 | 60 | 50 | 50 | 60 | 50 | — |
| | TEPIC-VL | — | — | — | 10 | 20 | 40 | — | 100 |
| | PB3600 | — | — | — | — | — | — | 20 | — |
| Curing agent | SI-100L | 0.4 | 0.4 | 0.4 | 0.4 | 0.4 | 0.4 | 0.4 | 0.4 |
| Antioxidant | IRG1010 | 1 | 1 | 1 | 1 | 1 | 1 | 1 | 1 |
| | HP-10 | 1 | 1 | 1 | 1 | 1 | 1 | 1 | 1 |
| Water- and oil-repellant | E-1630 | 3 | 3 | 3 | 3 | 3 | 3 | 3 | 3 |
| Proportion of cycloaliphatic epoxy groups to all epoxy groups in curable composition (mole percent) | | 70 | 76 | 80 | 68 | 62 | 63 | 85 | 0 |
| Curing rate (%) | After molding and before annealing | 98 | 99 | 99 | 98 | 98 | 96 | 99 | 65 |
| | After annealing | 100 | 100 | 100 | 100 | 99 | 98 | 100 | 74 |
| Tg (tan δ) (° C.) | | 125 | 130 | 129 | 124 | 117 | 161 | 144 | 88 |
| Viscosity (Pa · s) | | 0.18 | 0.15 | 0.13 | 0.71 | 1.1 | 3.2 | 1.5 | 7.0 |
| Transmittance (400 nm) | 150° C. for 0 hr | 90.4 | 90.6 | 90.8 | 90.5 | 90.3 | 90.1 | 87.3 | 87.0 |
| | 150° C. for 50 hr | 88.3 | 88.9 | 89.1 | 88.6 | 87.8 | 80.1 | 68.1 | 72.1 |
| | 150° C. for 100 hr | 85.9 | 87.3 | 87.3 | — | — | — | — | — |
| | 150° C. for 125 hr | — | — | — | 84.4 | 83.5 | 58.7 | 6.5 | 57.6 |
| | 150° C. for 150 hr | 82.0 | 85.2 | 84.8 | — | — | — | — | — |
| | 150° C. for 175 hr | 79.6 | 83.6 | 83.2 | 81.4 | 80.9 | 48.5 | 0.6 | 50.5 |
| | 150° C. for 220 hr | 71.3 | 79.0 | 78.3 | 76.7 | 76.7 | 38.7 | 0.0 | 43.0 |
| Transmittance (450 nm) | 150° C. for 0 hr | 91.5 | 91.6 | 91.7 | 91.6 | 91.6 | 91.4 | 89.0 | 90.0 |
| | 150° C. for 50 hr | 90.6 | 90.7 | 90.9 | 90.8 | 90.6 | 87.5 | 82.3 | 84.3 |
| | 150° C. for 100 hr | 89.8 | 90.2 | 90.0 | — | — | — | — | — |
| | 150° C. for 125 hr | — | — | — | 89.5 | 89.0 | 79.1 | 39.7 | 79.4 |
| | 150° C. for 150 hr | 88.5 | 89.6 | 89.3 | — | — | — | — | — |
| | 150° C. for 175 hr | 87.6 | 88.9 | 88.7 | 88.3 | 87.9 | 74.5 | 17.8 | 77.2 |
| | 150° C. for 220 hr | 84.2 | 87.3 | 86.9 | 86.3 | 86.3 | 68.9 | 4.1 | 73.6 |
| Refractive index | 150° C. for 0 hr | 1.50363 | 1.50268 | 1.50230 | 1.50490 | 1.50705 | 1.52090 | 1.50824 | 1.53533 |
| | 150° C. for 50 hr | 1.50329 | 1.50214 | 1.50192 | 1.50458 | 1.50679 | 1.52094 | 1.50750 | 1.53550 |
| | 150° C. for 100 hr | 1.50301 | 1.50155 | 1.50166 | — | — | — | — | — |
| | 150° C. for 125 hr | — | — | — | 1.50415 | 1.50628 | 1.52138 | 1.50840 | 1.53627 |
| | 150° C. for 150 hr | 1.50267 | 1.50172 | 1.50144 | — | — | — | — | — |
| | 150° C. for 175 hr | 1.50265 | 1.50135 | 1.50101 | 1.50388 | 1.50600 | 1.52158 | 1.50951 | 1.53609 |
| | 150° C. for 220 hr | 1.50309 | 1.50151 | 1.50093 | 1.50392 | 1.50392 | 1.52209 | 1.51214 | 1.53650 |
| Abbe number | 150° C. for 0 hr | 52.3 | 53.7 | 54.2 | 53.0 | 52.4 | 51.3 | 51.2 | 47.3 |
| | 150° C. for 50 hr | 52.6 | 53.5 | 54.1 | 53.5 | 53.1 | 50.9 | 50.9 | 47.0 |
| | 150° C. for 100 hr | 52.9 | 55.1 | 54 | — | — | — | — | — |
| | 150° C. for 125 hr | — | — | — | 53.1 | 52.7 | 50.4 | 47.3 | 46.1 |
| | 150° C. for 150 hr | 52.5 | 53.7 | 54.2 | — | — | — | — | — |
| | 150° C. for 175 hr | 52.5 | 53.9 | 54.2 | 53.5 | 53.3 | 50.6 | 46.6 | 46.2 |
| | 150° C. for 220 hr | 52.1 | 52.1 | 52.1 | 53.4 | 53.4 | 49.8 | 42.0 | 46.0 |

The abbreviations in Table 1 will be described below.

Curable Compound

X-40-2728: Cyclic siloxane containing two glycidyl groups per molecule and having a weight per epoxy equivalent of 262 g/eq; trade name X-40-2728, supplied by Shin-Etsu Chemical Co., Ltd.

X-40-2670: Cyclic siloxane containing four cycloaliphatic epoxy groups per molecule and having a weight per epoxy equivalent of 184 g/eq; trade name X-40-2670, supplied by Shin-Etsu Chemical Co., Ltd.

YX8040: Hydrogenated bisphenol-A diglycidyl compound (trade name YX8040, supplied by Mitsubishi Chemical Corporation)

A-1: Bis(3,4-epoxycyclohexylmethyl) ether

TEPIC-VL: Triglycidyl isocyanurate (trade name TEPIC-VL, supplied by Nissan Chemical Industries, Ltd.)

PB3600: Epoxidized polybutadiene (trade name EPOLEAD PB3600, supplied by Daicel Corporation)

Curing Agent

SI-100L: Cationic thermal initiator, as an aromatic sulfonium salt including PFC as an anionic species (trade name San-Aid SI-100L, supplied by SANSHIN CHEMICAL INDUSTRY CO., LTD.)

Antioxidant

IRG1010: Pentaerythritol tetrakis[3-(3,5-di-t-butyl-4-hydroxyphenol) propionate] (trade name IRGANOX 1010, supplied by BASF SE)

HP-10: 2,2'-Methylenebis(4,6-di-t-butylphenyl)octyl phosphite (trade name HP-10, supplied by ADEKA CORPORATION)

Water- and Oil-Repellant

E-1630: 3-Perfluorohexyl-1,2-epoxypropane (trade name E-1630, supplied by Daikin Industries Ltd.)

INDUSTRIAL APPLICABILITY

The curable composition according to the present invention has such excellent curability as to be rapidly cured by heating for about 2 to about 3 minutes to form a cured product. The resulting cured product resists yellowing and successfully maintains excellent transparency over a long time in a high-temperature environment. The curable composition is therefore advantageously usable as materials for wafer-level lenses.

The invention claimed is:

1. A curable composition comprising:
a cycloaliphatic epoxide (A), wherein the cycloaliphatic epoxide (A) comprises at least one of bis(3,4-epoxycyclohexylmethyl) ether and 2,2-bis(3,4-epoxycyclohex-1-yl)propane;
a siloxane compound (B) containing two or more glycidyl groups per molecule; and
a curing agent (C).

2. The curable composition according to claim 1,
wherein the curable composition comprises the cycloaliphatic epoxide (A) in a content of 5 to 70 weight percent based on the total amount (100 weight percent) of the curable composition.

3. A cured product of a curable composition comprising:
a cycloaliphatic epoxide (A), wherein the cycloaliphatic epoxide (A) comprises at least one of bis(3,4-epoxycyclohexylmethyl) ether and 2,2-bis(3,4-epoxycyclohex-1-yl)propane;
a siloxane compound (B) containing two or more glycidyl groups per molecule; and
a curing agent (C).

4. The cured product according to claim 3,
wherein the curable composition comprises the cycloaliphatic epoxide (A) in a content of 5 to 70 weight percent based on the total amount (100 weight percent) of the curable composition.

5. A method for producing a wafer-level lens, the method comprising subjecting a curable composition comprising:
a cycloaliphatic epoxide (A);
a siloxane compound (B) containing two or more glycidyl groups per molecule; and
a curing agent (C),
the cycloaliphatic epoxide (A) represented by Formula (1):

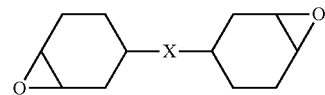

(1)

wherein X is selected from a single bond and a linkage group to molding.

6. A wafer-level lens obtained by the method according to claim 5.

7. A camera comprising the wafer-level lens according to claim 6.

8. The method for producing a wafer-level lens according to claim 5,
wherein the cycloaliphatic epoxide (A) comprises at least one of bis(3,4-epoxycyclohexylmethyl) ether and 2,2-bis(3,4-epoxycyclohex-1-yl)propane.

9. A wafer-level lens obtained by the method according to claim 8.

10. A camera comprising the wafer-level lens according to claim 9.

11. The method for producing a wafer-level lens according to claim 5,
wherein the curable composition comprises the cycloaliphatic epoxide (A) in a content of 5 to 70 weight percent based on the total amount (100 weight percent) of the curable composition.

12. A wafer-level lens obtained by the method according to claim 11.

13. A camera comprising the wafer-level lens according to claim 12.

14. A curable composition comprising:
a cycloaliphatic epoxide (A);
a siloxane compound (B) containing two or more glycidyl groups per molecule and having a cyclic siloxane skeleton; and
a curing agent (C),
the cycloaliphatic epoxide (A) represented by Formula (1):

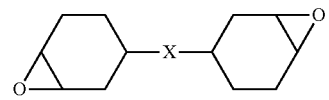

(1)

wherein X is selected from a single bond and a linkage group.

* * * * *